United States Patent Office 2,811,426
Patented Oct. 29, 1957

2,811,426

TREATING ALUMINUM SURFACES

Ralph B. Mason, New Kensington, Pa., assignor to Aluminum Company of America, Pittsburgh, Pa., a corporation of Pennsylvania No Drawing. Application February 21, 1955,
Serial No. 489,789

4 Claims. (Cl. 41—42)

This invention is an improvement upon that described in my prior United States Letters Patent No. 2,507,314. It relates to methods of treating aluminum surfaces to produce a uniform matte finish free of streaks and uneven color characteristics, preferably, but not necessarily, white in appearance and particularly useful where the surface is to be employed in the decorative, printing or reproducing arts or as a base for paint. The method of the invention requires but one cycle of film formation and removal, whereas my prior invention required the formation of a film on the aluminum surface and the removal of this film and then a repetition of this treatment through at least one more complete cycle and, usually, through several such complete cycles. According to the present invention, the film is formed on the aluminum surface by treating that surface with a solution of sodium fluoride and sodium aluminate. The film thus formed is then removed from the surface with an acid solution. The surface thus obtained may be treated to develop thereon other films or coatings if such be desired. A particularly useful application of the invention is in the art of preparing aluminum surfaces for use in planographic printing. The commercial methods still prevalent for the preparation of aluminum printing plates involve mechanical graining of the aluminum surface by subjecting it to the action of abrasive materials. The lack of uniform results from such graining treatments has previously led to experimentation with chemical processes intended to obtain the desired effects. Most chemical treatments have, however, been deficient in certain particulars the most common of which has been lack of uniformity of the chemical action with the result that the treated surface is streaked. Another common fault of such surfaces is lack of the necessary water and ink adsorptive qualities.

When an aluminum surface is immersed in a solution of sodium fluoride and sodium aluminate, there immediately results a relatively short period of chemical action, accompanied by gas evolution, which is promptly terminated, for all practical purposes, by the formation on the aluminum of an impervious film which effectively prevents further reaction. The duration and depth of the attack on the aluminum surface is governed by the activity of the aluminum surface, the concentration of the fluoride and aluminate in the attacking solution and the temperature of that solution. This is true whether the aluminum surface be of pure aluminum, a commercial grade thereof or an alloy consisting predominantly of aluminum, all of which are designated herein and in the appended claims by the term "aluminum surface." The duration of attack is, in any case, short, and when the preferred solution is used, one made up essentially of 2 percent by weight sodium fluoride and 0.15 percent sodium aluminate, and the solution is heated near its boiling point, the period of reaction is very short before the formation of the substantially impervious film makes the aluminum surface immune from further attack.

The dark film formed on the aluminum surface in the fluoride-aluminate solution is then removed and, in accordance with this invention, this is accomplished by treating the surface with an acid solution to dissolve or loosen and remove the film. This treatment readily develops upon the aluminum surface an evenly disposed matte finish which is usually white in appearance and is free of streaks and uneven color characteristics. The treatment cycle may be repeated if desired, but it is one of the advantages of the present invention that repetition of the treatment is not ordinarily required.

The acid (the term includes acid salts) used to strip, i. e. de-film, the treated aluminum surface is largely a matter of selection. If the product is to have a very white surface, the use of acids which tend to color the surface should, of course, be avoided. Acid solutions which attack too severely and roughen the surface may usually be adjusted in concentration to avoid undue severity of attack. Acid solutions which attack too mildly may be increased in efficiency by adjustment of the temperature of treatment. The period and temperature of treatment will necessarily depend upon the nature and temperature of the acid solution. Such factors are purely operative in character and are readily controlled by the operator since the desired result, the removal of the film, is readily observed by the relatively sudden change in surface appearance. Mixtures of acids may often be desirable and I have found that the presence of chromic acid is particularly useful in insuring that a solution of sulphuric or phosphoric acid produces a white color. In the preparation of surfaces for printing where extreme whiteness is desirable, the following acid solutions have been used with good results:

(a) Nitric acid solution—50% $HNO_3$ by weight.
(b) Nitric acid and chromic acid solution—10% by weight of $HNO_3$ and 1% by weight of $CrO_3$.
(c) Sodium acid sulphate and chromic acid solution—20% by weight of $NaHSO_4$ and 3% by weight of $CrO_3$.
(d) Sulphuric acid and chromic acid solution—10% by volume of concentrated $H_2SO_4$ and 1 to 3% by weight of $CrO_3$.

In the practice of the invention it is desirable, although often not necessary, to first clean the aluminum surface by washing it free of all dirt and grease. For this purpose a solution which attacks or etches the surface slightly may be employed. Good results are obtainable when a warm solution (at about 150° F.) containing about 5 percent by weight sodium hydroxide is used (for about ½ minute) as a cleaner. Another solution commonly employed at room temperature is that containing about 2½ percent by weight hydrofluoric acid. Thereafter the surface is subjected to the treatment of the invention.

The amount of sodium fluoride present in the treating solution to achieve the results described may vary between about 0.5 and about 4 percent by weight, and is best employed in aqueous solutions in amounts of about 1 to 3 percent by weight. The amount of sodium aluminate present may vary between about 0.025 and 1 percent by weight, and is best employed in the aqueous solutions in amounts of about 0.03 to 0.2 percent by weight. Usually operating temperatures, for best results, are in the range of about 150° to 212° F., preferably about 207° F., and a time of treatment of about 1½ to 3½ minutes is ordinarily sufficient.

The operating characteristics of the solutions may also be economically retained when about 0.1 to 0.2 percent by weight of sodium hydroxide is added. Although the use of such an addition is optional, I have found it very useful in obtaining a long solution life with uniform attack on the aluminum surface under treatment.

An etching and filming solution of general usefulness is made up of (by weight):

| | Percent |
|---|---|
| Sodium fluoride | 2 |
| Sodium aluminate | 0.15 |
| Water | Balance |

Another suitable solution is made up of (by weight):

| | Percent |
|---|---|
| Sodium fluoride | 2 |
| Sodium aluminate | 0.04 |
| Sodium hydroxide | 0.15 |
| Water | Balance |

Either solution is best used at about 207° F. for about 1½ to 3½ minutes. Substantial quantities of aluminum may be treated in these solutions without requiring their being discarded or re-adjusted as to composition.

Whether the treatment of the aluminum surface with fluoride-aluminate solutions produces on the aluminum surface a covering properly described as a film or more properly described as a coating is not definitely known to me. I therefore use the word "film" in a broad sense to include and describe whatever is formed on the aluminum surface by these solutions.

The aluminum surface finally produced may be further treated for special purposes if desired. Any soluble silicate may be used for this purpose, such as an alkali metal silicate, but glycol silicate is preferred. The treatment with the silicate is simple and involves no expensive apparatus, the surface being immersed in or otherwise exposed to the silicate solution. A hot solution of silicate is preferably used and it is desirable that the surface be washed with water as soon as it is withdrawn from exposure to the silicate solution. The time of treatment and the concentration of the solution are variable but ordinarily treatments of over about 2 to 5 minutes in solutions containing at least 0.5 percent by weight of the silicate gives good results. The time of treatment may be reduced if the aluminum is made anode, at about 12 volts, in the silicate solution. The surface, if hardness is desired, may be hardened by applying thereto an anodically formed coating. When used as a paint base, the surface may, if desired, be treated in a chromic acid or chromate solution before the paint is applied. Other after-treatments will suggest themselves to those skilled in the art, depending upon the use to which the aluminum surface is to be put.

The matte surface produced by the practice of this invention is, because of its uniformity and its freedom from streaks or color defects, useful for many purposes. Its usual appearance is white, although some aluminum alloys have compositions which effectively prevent a high degree of whiteness, and this whiteness and uniformity of surface characteristics are particularly useful in the decorative, printing and reproducing arts.

What I claim is:

1. The method of treating an aluminum surface to produce a uniform matte finish which comprises immersing the aluminum surface in a solution maintained at about 150 to 212° F. and made up essentially of about 0.5 to 4 percent by weight of sodium fluoride, about 0.025 to 1 percent of sodium aluminate, and water, until substantial reaction ceases, and then subjecting the aluminum surface to the action of acid to remove the film formed in the aforesaid solution.

2. The method of claim 1 in which the solution referred to also is made up with about 0.1 to 0.2 percent sodium hydroxide.

3. The method of treating an aluminum surface to produce a uniform matte finish which comprises immersing the aluminum surface in a solution maintained at about 207° F. and made up essentially of about 1 to 3 percent by weight of sodium fluoride, about 0.03 to 0.2 percent of sodium aluminate, and water, for about 1½ to 3½ minutes, and then subjecting the aluminum surface to the action of acid to remove the film formed in the aforesaid solution.

4. The method of claim 3 in which the solution referred to also is made up with about 0.15 percent sodium hydroxide.

References Cited in the file of this patent
UNITED STATES PATENTS

| 2,106,368 | Wescott | Jan. 25, 1938 |
| 2,146,839 | Newsome | Feb. 14, 1939 |
| 2,332,497 | Burkard | Oct. 26, 1943 |
| 2,507,314 | Mason | May 9, 1950 |